United States Patent [19]

Erion

[11] Patent Number: 5,369,554
[45] Date of Patent: Nov. 29, 1994

[54] ILLUMINATOR UTILIZING MULTIPLE LIGHT GUIDES

[75] Inventor: Jeffrey A. Erion, Plymouth, Mich.

[73] Assignee: Ford Motor Company, Dearborn, Mich.

[21] Appl. No.: 1,608

[22] Filed: Jan. 7, 1993

[51] Int. Cl.⁵ .................................................. F21V 8/00
[52] U.S. Cl. ........................................ 362/31; 362/32; 362/80
[58] Field of Search ............... 362/31, 32, 80, 297, 362/308, 327, 812, 26, 36; 385/47

[56] References Cited

U.S. PATENT DOCUMENTS

| | | | |
|---|---|---|---|
| 1,902,440 | 3/1933 | Gill, Jr. | 362/327 |
| 4,389,698 | 6/1983 | Cibie . | |
| 4,432,039 | 2/1984 | Cibie . | |
| 4,456,948 | 6/1984 | Brun . | |
| 4,528,617 | 7/1985 | Blackington | 362/32 |
| 4,556,928 | 12/1985 | Tysoe . | |
| 4,644,455 | 2/1987 | Inglis et al. . | |
| 4,691,268 | 9/1987 | Benson | 362/812 |
| 4,740,871 | 4/1988 | Dilouya . | |
| 4,745,525 | 5/1988 | Sheehy | 362/80 |
| 4,811,172 | 3/1989 | Davenport et al. . | |
| 4,868,718 | 9/1989 | Davenport et al. . | |
| 4,883,333 | 11/1989 | Yanez . | |
| 4,899,260 | 2/1990 | Schrammck | 362/32 |
| 4,977,487 | 12/1990 | Okamo | 362/32 |
| 5,001,306 | 3/1991 | Purcell | 362/33 |
| 5,037,105 | 8/1991 | Klein | 273/237 |
| 5,217,290 | 6/1993 | Windross | 362/31 |

FOREIGN PATENT DOCUMENTS 3542292  7/1986  Germany .................. 362/290

*Primary Examiner*—Richard R. Cole
*Assistant Examiner*—Y. Quach
*Attorney, Agent, or Firm*—Damian Porcari; Roger L. May

[57] ABSTRACT

A lighting system for an optical device for producing a linear light beam from multiple light guides. A plurality of light guides are equally spaced or terminated inside a molded clear plastic optical material. The ends staggered in such a way as to terminate at predetermined positions adjacent shaped openings which reflect the light rays exiting the light guides through total internal reflection. The surface of the molded block shaped to focus or spread of the light beam. The reflective surfaces may also be shaped to focus or spread of the light beam.

8 Claims, 2 Drawing Sheets

ILLUMINATOR UTILIZING MULTIPLE LIGHT GUIDES

BACKGROUND OF THE INVENTION

1. Field of the Invention

The present invention relates generally to a lighting system for use in vehicle lighting systems, and specifically to, an illuminator, receiving light from a plurality of light guides such as fiber optic light pipes, for use as a high mount stoplight.

2. Description of the Related Art

Typically lighting systems utilize a bulb and parabolic reflector combination. In a bulb and reflector combination, energy supplied to a bulb filament radiates light which is collected by the reflector and reflected in a desired direction to illuminate a specific area. Bulb and reflector systems have several disadvantages including size and space limitations and thermal design properties; i.e., dissipating the heat generated during bulb operation is a concern with a bulb and reflector.

With the advent of light guides such as fiber optics, the ability to use a remote light source and a light guide to transfer light generated at the remote light source to a distant location became available. Several different lighting systems have been developed which utilize a remote light source and plurality of light guides, U.S. Pat. No. 4,811,172 shows such a system. The patent discloses a remote light source transmitting light through a plurality of light guides to a plurality of lenses. The ends of the light guides are positioned adjacent or near a respective reflective element. Additionally, each light guide/reflective element combination requires a respective lens element.

While this approach may have some limited use, it is desirable to reduce the number of lenses and provide a simple, efficient and secure mounting structure for positioning the light guides adjacent or at predetermined position in close proximity to the reflective elements.

SUMMARY OF THE INVENTION

Accordingly, the present invention is an illuminator for a lighting system preferably suited for use on a vehicle, such as exterior or interior illumination. The illuminator includes a remote light source providing light through a plurality of light guides to an illuminator block. The light guides terminate in the illuminator block adjacent a plurality of shaped openings. The openings form reflective surfaces which reflect and direct the light emanating from the light guides outward in a predetermined pattern. The present invention may also include forming the external or outer surface of the illuminator block such that the surface acts as a lens to further shape and direct the light beam into the desired or predetermined pattern.

One advantage of the present invention is that an illuminator is provided free of individually air spaced optical elements which are dependant upon precise optical alignment. Once the illuminator profile is developed for a particular use, the present invention results in long term stability in optical alignment, removal of heat and reduced use of costly mechanical fittings. A further advantage of the present invention is that it provides an illuminator which may be shaped to control beam direction or spread.

DESCRIPTION OF THE PREFERRED EMBODIMENT(S)

Figure 1:
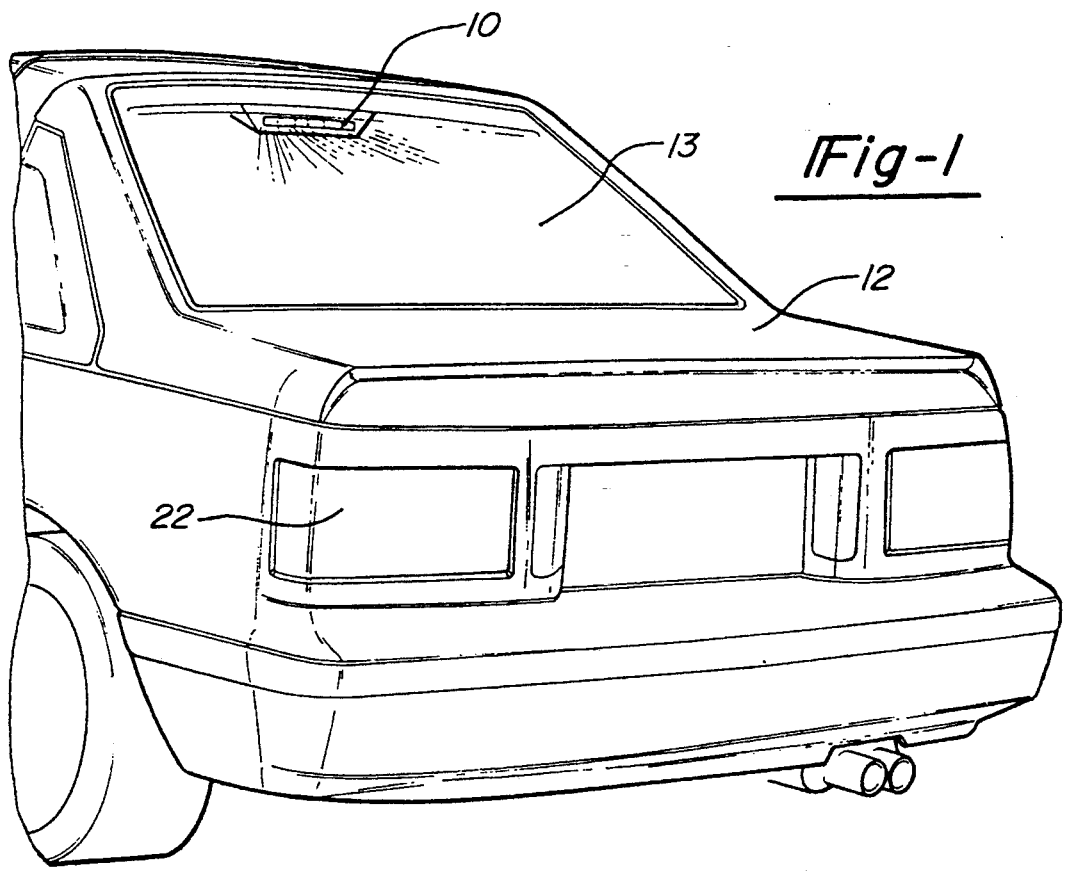
FIG. 1 is a perspective view of an illuminator according to the present invention illustrated as a high mount stoplight on the rear end of a vehicle.

Referring now to the drawings and more particularly to FIGS. 1 through 4, an illuminator 10, according to the present invention, is illustrated on a motor vehicle 12. The illuminator 10 is configured as a high mount stoplight mounted adjacent the rear window 13 on the motor vehicle 12. It should be appreciated that the illuminator 10 can also be used for motor vehicle taillights 22 and headlights (not shown).

Figure 2:
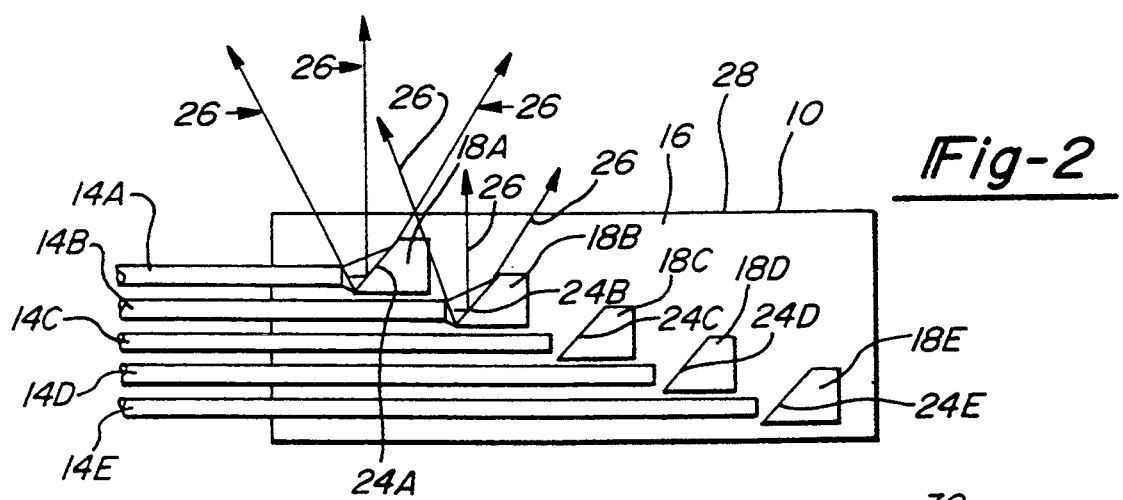
FIG. 2 is a top view of the illuminator of FIG. 1.
Figure 3:
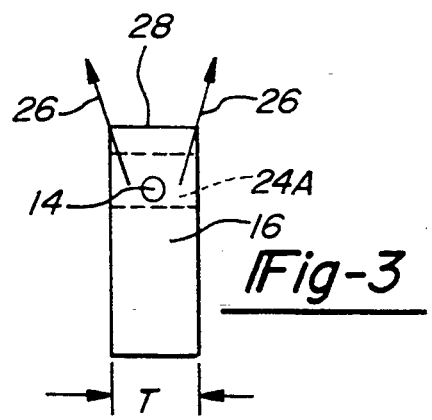
FIG. 3 is a side view of the illuminator of FIG. 1.
Figure 4:
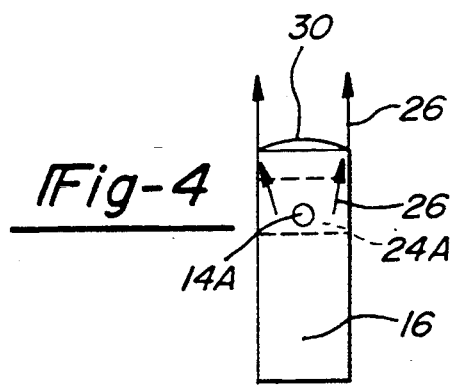
FIG. 4 is a side view of the illuminator of FIG. 1 having an alternative surface or lens construction.

Referring now to FIG. 2, the illuminator 10 includes a transparent optical block 16 having a plurality of shaped openings 18a–18e. A plurality of equally spaced light guides 14a–14e terminate inside the optical block 16. Typically, the illuminator 10 is of integral construction wherein the block 16 is molded about the light guides 14a–14e. The light guides 14a–14e terminate at determined spaced positions from the shaped openings 18a–18e in the block 16. The shaped openings 18a–18e provide reflective surfaces 24a–24e at the block/opening interfaces which reflect the light rays 26 emanating from the light guides 14a–14e. The light rays 26 are reflected and directed out of the optical block 16 as useable light.

Preferably, the light guides 14a–14e take the form of a ribbon or cable. The light enters the light guides 14a–14e through one of several types of conventional remote light sources. The light rays 26 travel through the plurality of light guides 14a–14e to each respective end. The exit or cone angle of the light exiting the light guides 14a–14e is determined by the entrance angle; i.e., the greater the angle at which light may enter the light guide the greater the exit angle. The size or surface area of the reflective surfaces 24a–24e which the reflect light rays 26 exiting the light guides 14a–14e is determined by the cone angle of the light guides 14a–14e and the position of the reflective surfaces 24a–24e with respect to the ends of the light guides 14a–14e. As illustrated in FIG. 2, the light rays 26 do not exit the end of the light guides 14a–14e parallel with the axes of the light guides 14a–14e, the rays 26 are reflected off of the reflective surface 24a–24e at varying degrees up to the specified cone angle for the light guides 14a–14e. As shown in FIG. 2, the reflective surfaces 24a–24e are inclined at a 45° angle with respect to the longitudinal axes of the light guides 14a–14e.

It should be appreciated that the reflective surfaces 24a–24e of the shaped openings 18a–18e do not require a mirrorized surface. The light rays 26 emanating from the light guides 14a–14e are reflected at the block/opening interfaces through the principle of total internal reflection. Total internal reflection of the light rays 26 occurs when the incidence angle Θ exceeds the critical angle $\Theta_c$ given by the equation $\Theta_c = \sin^{-1}(n_1/n_2)$ wherein $n_1$ is the index of refraction of the surrounding medium, and $n_2$ is the index of refraction of the coupler medium. As shown in FIG. 2, the shaped openings 18a–18e are simply openings in the block which are filled with air. Therefore, if $n_1 = 1$ and the block is made from a plastic material having an $n_2 = 1.5$ then the critical angle for total internal reflection $\Theta_c = 42°$.

If, a polycarbonate material having an $n_2$ value of 1.59, is used as the material for the block 16, then $\Theta_c = 39°$. Therefore, any light rays 26 having an incident angle $\Theta$ with respect to the reflective surfaces 24a–24c greater than the critical angle $\Theta_c$ would be totally reflected. While in the present embodiment total internal reflection is used to reflect the light rays 26, it should be appreciated that other known methods for creating a reflective surface may be used, such as an aluminized reflective surface.

Figure 5:
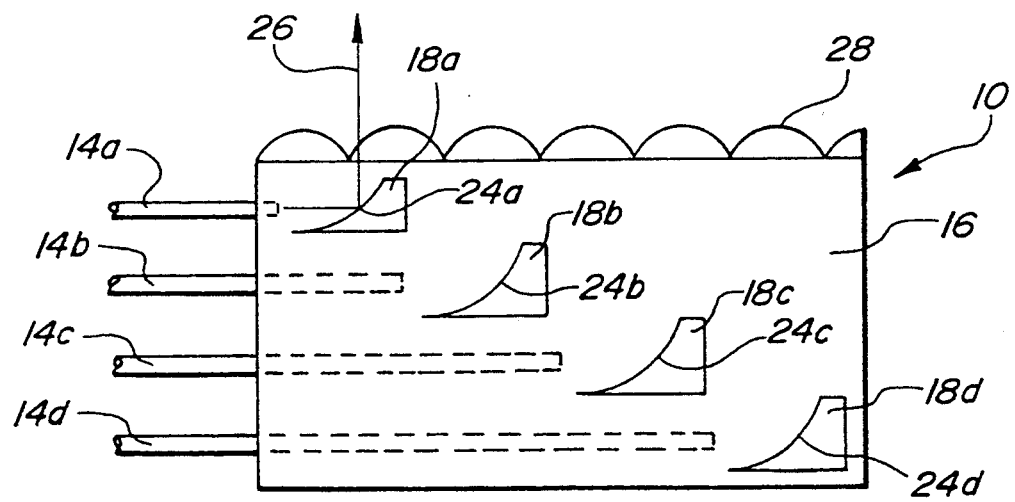
FIG. 5 is a side view of the illuminator of FIG. 1 having a complex reflective surface.
Figures 6, 7:
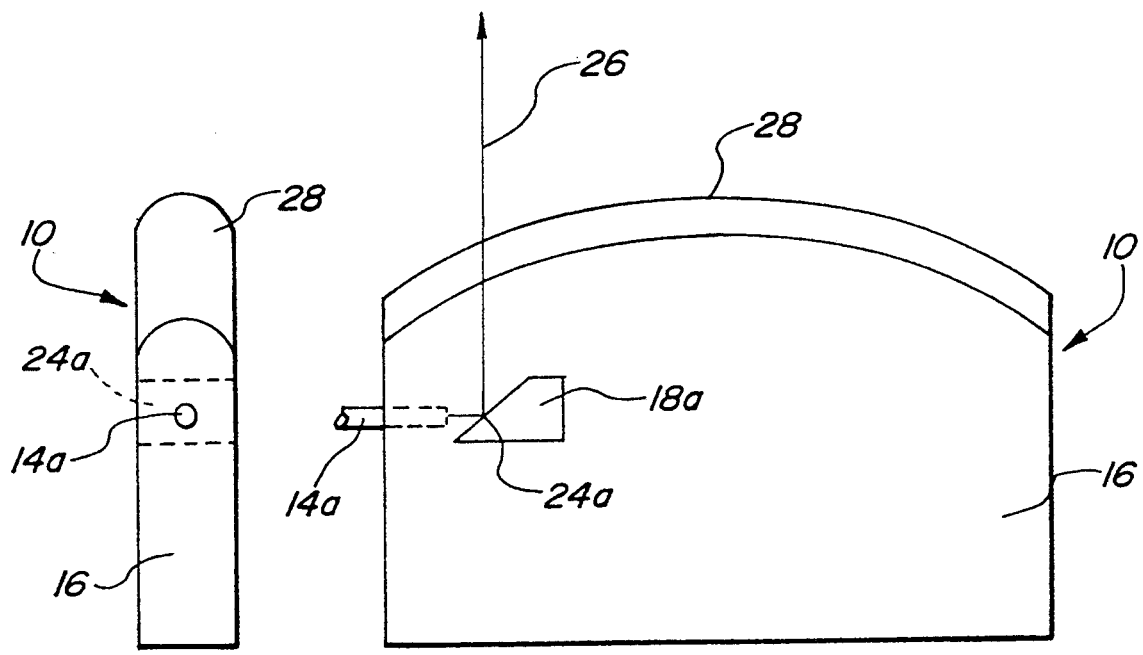
FIG. 6 is a side view of the illuminator of FIG. 1 having a second alternative surface or lens construction.
FIG. 7 is a side view of the embodiment of FIG. 6.

It should be appreciated that the shaped openings 18a–18e and corresponding reflective surfaces 24a–24e are spaced in the block at regular intervals such that the reflected light is directed out through the outer surface 28 of the block 16. While the reflective surfaces 24a–24e are disclosed as planar surfaces, many other shapes, see FIG. 5, such as compound or complex surfaces, including paraboloidal or ellipsoidal surfaces can be used to reflect the light rays 26 emanating from the light guides 14a–14e.

As illustrated in FIGS. 4–7, the outer surface 28 of the block 16 may be shaped so as to focus or spread the light rays 26. The outer surface 28 may comprise pillow type optics, fresnel lenses, or simple or compound curvatures. The thickness (t) of the block is also variable depending on the requirement or application. Increasing either the distance from the end of the light guides 14a–14e to the reflective surfaces 24a–24e, or the cone angle of the light guides 14a–14e increases the surface area covered by the light exiting the light guides 14a–14e. Increasing the surface area covered by the light guides 14a–14e correspondingly increases the thickness (t) of the block resulting in a wider light beam.

It should also be appreciated that the light guides 14a–14e may be inclined or positioned adjacent the reflective surface at an angle.

The illuminator 10 may be used for various applications in styling and lighting of a vehicle. The illuminator 10 may be designed to emit light in a specified pattern and at a particular level of intensity and is suitable to provide for illumination of a vehicle such as a stop light, taillight, license plate light and back up light applications. The illuminator may also be used to light the interior of the vehicle whereby a single remote light source provides light to a plurality of light guides each terminating at a different illuminator.

What is claimed is:

1. An illuminator for use with a remote light source comprising:
    an array of light guides transmitting light from said remote light source to a plurality of reflective surfaces;
    a block of transparent optical material, the ends of the light guides terminating therein, said block having shaped openings defining block/opening interfaces at spaced positions from the ends of said light guides;
    said shaped openings are filled with air and the index of refraction between the optical material and air in said shaped openings results in total internal reflection of light at the block/opening interfaces thereby creating reflective surfaces; wherein light rays reflected by said reflective surfaces and said block includes a shaped outer surface to control said light rays for creating a specific beam pattern.

2. An illuminator as set forth in claim 1 wherein said outer surface having a compound curvature.

3. An illuminator as set forth in claim 1 wherein said outer surface comprising a pillow lens.

4. An illuminator as set forth in claim 1 wherein said optical material is molded over said light guides.

5. An illuminator for use with a remote light source comprising:
    an array of light guides transmitting light from said remote light source;
    a block of transparent optical material, the ends of the light guides terminating therein, said block having shaped openings defining block/opening interfaces at spaced positions from the ends of said light guides;
    said shaped openings are filled with air and the index of refraction between the optical material and air in said shaped openings results in total internal reflection of light at the block/opening interfaces thereby creating reflective surfaces; and said block including a means for controlling shape and direction of light rays exiting said light guides and reflected by said reflective surfaces to form a light beam.

6. An optical device for producing a light beam from a remote light source comprising:
    a block formed of a first medium;
    at least one light guide having a first end connected to said remote light source and a second end terminating inside said block;
    said block having at least one shaped opening defining a block/opening interface adjacent the second end of said light guide;
    said block/opening interface defining a reflective surface for reflecting the light exiting said light guide; and a second medium residing in said shaped opening, wherein the index of refraction of the first medium and the second medium residing in the shaped opening results in total internal reflection of the light at the reflective surface defined by the block/opening interface; and said block including a means for shaping the light reflected by said reflective surface to form a light beam.

7. An optical device according to claim 6 wherein the means for shaping the light beam includes a lens.

8. An illuminator comprising:
    a transparent member having a plurality of spaced apart openings therein, each opening defining a block/opening interface, said block opening interface forming a reflective surface;
    a plurality of light guides terminating in said member said light guides terminating at predetermined positions adjacent said openings such that light exiting the light guides is reflected by the respective reflective surfaces and exits the member in the form of a light beam; and
    wherein air resides in said openings and wherein the index of refraction between the transparent member and the air in said openings is such that total internal reflection of light occurs at the reflective surfaces; and
    said member including means for shaping the light exiting said transparent member.

* * * * *